United States Patent Office 3,819,627
Patented June 25, 1974

3,819,627
1-SUBSTITUTED-3,4-DIHYDRO-2(1H)-QUINAZOLINONES
Hans Ott, Basel-Land, Switzerland, assignor to Sandoz-Wander, Inc., Hanover, N.J.
No Drawing. Continuation-in-part of abandoned application Ser. No. 741,807, July 1, 1968. This application Sept. 28, 1970, Ser. No. 76,222
The portion of the term of the patent subsequent to Oct. 9, 1990, has been disclaimed
Int. Cl. C07d 51/48
U.S. Cl. 260—251 QB
12 Claims

ABSTRACT OF THE DISCLOSURE

1-Substituted-3,4-dihydro - 2(1H) - quinazolinones from the group of 1-substituted-3,4-dihydro-4-aryl-2(1H)-quinazolinones and 1,3 - disubstituted - 3,4 - dihydro-4-aryl-2-(1H)-quinazolinones, which are useful because of pharmacological activity, for example, as anti-inflammatory agents. Also disclosed is process utilizing the 1-substituted-3,4-dihydro-4-aryl-2(1H)-quinazolinones as intermediates in preparation of 1-substituted - aryl-2(1H) - quinazolinones which are also useful as anti-inflammatory agents.

---

This application is a continuation-in-part of copending application Ser. No. 741,807 filed July 1, 1968, now abandoned.

The present invention relates to bicyclic compounds. More particularly, the invention provides 1-substituted-3,4-dihydro-2(1H)-quinazolinones from the group of 1-substituted-3,4-dihydro-4-aryl-2(1H) - quinazolinones and 1,3 - substituted-3,4-dihydro-4-aryl-2(1H)-quinazolinones, methods for preparation of said 3,4-dihydro-2(1H)-quinazolinones and pharmacological compositions incorporating said compounds.

The chemical compound which is 4-phenyl-3,4-dihydro-2(1H)-quinazolinone has been heretofore disclosed in the literature, e.g., J. Chem. Soc. *1959*, 3555. To my knowledge no pharmacological activity has been associated with said 4-phenyl-3,4-dihydro-2(1H)-quinazolinone.

In accordance with the present invention, it has been found that new 1-substituted and 1,3-substituted-quinazolinones having pharmacological activity are represented by the following structural formula I:

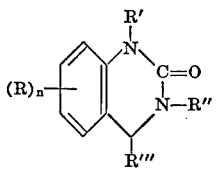

I wherein

R is, independently, hydrogen, halo, preferably having an atomic weight no greater than 80, i.e., fluoro, bromo and chloro; lower alkyl; preferably containing 1 to 5 carbon atoms; lower alkoxy; nitro; cyano; lower alkylthio; amino; hydroxy; mercapto; acetamido; or trifluoromethyl;

n is 1 or 2, and when 2, R is the same or different and either hydrogen, halo, lower alkyl or lower alkoxy, as defined above;

R' is lower alkyl, preferably containing 1 to 5 carbon atoms, e.g., methyl, ethyl, propyl, isopropyl; butyl, sec-butyl and isobutyl;

R" is hydrogen; lower alkyl of 1 to 5 carbon atoms; or ω-di(lower)alkylamino(lower)alkyl, e.g., 3-dimethylaminopropyl;

R''' is phenyl; or substituted phenyl of the formula:

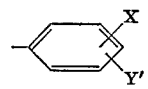

Y represents halo; hydroxy; lower alkyl, preferably containing from 1 to 4 carbon atoms, e.g., methyl, ethyl, propyl and butyl; lower alkoxy, preferably containing from 1 to 4 carbon atoms, e.g., methoxy, ethoxy, propoxy and butoxy; or trifluoromethyl; and Y' represents hydrogen; halo; hydroxy; lower alkyl, preferably containing from 1 to 4 carbon atoms, e.g., methyl, ethyl, propyl and butyl, or lower alkoxy preferably containing from 1 to 4 carbon atoms, e.g., methoxy, ethoxy, propoxy and butoxy.

The compound of formula I in which R" is hydrogen are preferably produced by a Step A reaction involving reduction of the corresponding 1-substituted-2(1H)-quinazolinone of the formula II:

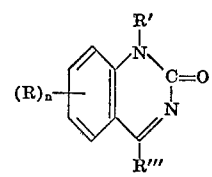

II wherein R, R', R''' and n have the above-defined meaning, in a suitable reaction medium, followed by isolation in a conventional manner to obtain compounds of the invention having the formula IA, as follows:

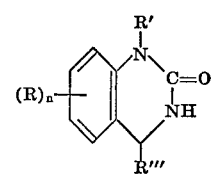

IA wherein R, R', R''' and n are as above-defined.

The compounds of formula I in which R" is other than hydrogen are preferably prepared by a Step B procedure from the corresponding 3,4-dihydro-2(1H)-quinazolinones of formula IA by forming therefrom in a reaction Step B-1 a 3-metallo derivative of the formula III:

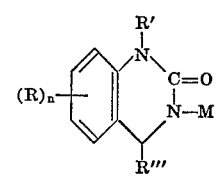

III wherein R, R', R''' and n are as previously defined and M is an alkali metal, preferably sodium or potassium, said 3-metallo-3,4-dihydroquinazolinone of formula III then being reacted by a Step B-2 procedure with an appropriate halide of the formula IV:

XR"B    IV wherein R"B is the same as R" except that hydrogen is omitted, and X represents halogen of atomic weight of from 35 to 127, i.e., chloro, bromo or iodo, preferably chloro, in a suitable reaction medium, followed by isolation in a conventional manner to obtain a 1,3-substituted-3,4-dihydro-2(1H)-quinazolinone of formula IB:

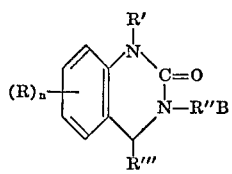

IB wherein R, R', R"B, R''' and n are as above-defined.

The production of compounds IA of the invention by the reaction of Step A is achieved as illustrated above by subjecting the corresponding 1-substituted-2(1H)-quinazolinone of formula II to chemical reduction. Such reduction is desirably effected with a suitable borohydride as reducing agent, desirably an alkali metal borohydride such as sodium borohydride, followed by working up in a manner conventional for such reductions. The reduction may be carried out at temperatures in the range of 0° C. to 80° C., preferably between 15° C. to 30° C. The reaction is carried out in a convenient organic solvent, preferably a lower alkanol such as methanol or ethanol, more preferably ethanol. Co-solvents such as methylene chloride, chloroform or water may be employed, if desired.

The preferred Step B procedure for preparation of compounds IB of the invention involves, as above summarized, the two reactions represented respectively by Step B–1 involving formation of a metallo salt and Step B–2 involving reaction of the salt with the appropriate organic halide of formula IV. It is advantageous, however, to carry out the reactions of both Step B–1 and B–2 in the same reaction system without isolation of the metallo salt formed by the reaction of Step B–1. The preparation of the 3-metallo salt of formula III from compounds of formula IA in Step B–1 may be effected by reacting the compound of formula IA with any of the conventional agents commonly employed for preparing alkali metal salts, e.g., sodium hydride or an alkali metal alkoxide such as sodium methoxide, sodium ethoxide, potassium methoxide and potassium ethoxide. The formation of the metallo salt may be effected at temperatures in the range of 0° C. to 100° C., preferably 20° C. to 60° C. The reaction of Step B–1 may be carried out in any of the known inert organic solvents convenient for the purpose with the preferred solvents being those also preferred for carrying out the reaction of Step B–2. Such preferred solvents include, by way of exemplification, dimethylacetamide, diethylacetamide, dimethylformamide, dimethylsulfoxide, and dioxane, more usually dimethylacetamide.

The preparation of compound IB by Step B–2 involving reaction of the metallo salt of formula III with the organic halide of formula IV may be carried out at temperatures in the range of 0° C. up to about 100° C., preferably at temperature between 15° C. to 60° C. In the more preferred forms of practice the organic halide is simply added to the mixture resulting from the reaction of Step B–1 enabling the use of the solvent of the Step B–1 reaction in the Step B–2 reaction and having the advantage of permitting the reaction of the Step B procedure to be completed in a single reactor and/or without separation or isolation of the 3-metallo salt provided by the Step B–1 reaction, if desired. The oganic halides of formula IV employed in the Step B–2 reaction are either known or can be readily prepared from known materials by established procedures.

The 1-substituted quinazolinones of formula II employed as starting material in Step A, above, may be produced by different procedures as will now be described. In the preferred method for preparing the compounds of structural formula II, an appropriately substituted o-aminobenzophenone is reacted with ethyl carbamate in the presence of a suitable Lewis acid, e.g., zinc chloride. Alternatively, the compounds of formula II may be prepared by reacting an alkali metal salt of an appropriately substituted quinazolinone with an appropriate halide (R'X). These processes are exemplified below:

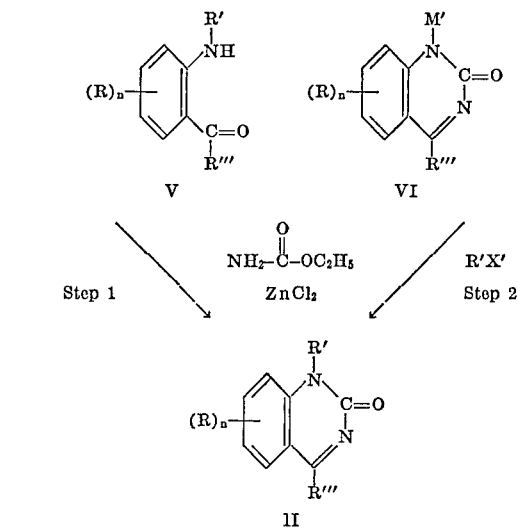

wherein R, R', R''' and n are as defined above, M' represents an alkali metal, preferably sodium or potassium, and X' represents halogen, preferably iodo.

Step 1 of the above-illustrated processes is conveniently carried out at elevated temperatures and in the presence of a catalytic amount of zinc chloride. Preferably, the reaction is effected at a temperature of from about 160° C. to about 200° C. If desired, the reaction may be carried out in the presence of a suitable inert organic solvent. However, the use of a solvent is not necessary since an excess of the carbamate can be used for this purpose. Depending upon the particular conditions employed the reac-time will generally vary from about 30 minutes to about 2 hours.

The conversion of the 1-metallo quinazolinone (IV) to the desired quinazolinone (II), as illustrated by Step 2, is conveniently carried out at room temperature (20° C.) or at elevated temperatures of up to about 100° C. Desirably, the reaction of the salt with the appropriate halide, preferably the iodide, is carried out in the same solvent employed to prepare the 1-metallo derivative (VI). The preparation of the latter is readily carried out by treating the corresponding 1-unsubstituted quinazolinone in conventional manner, with any of the conventional agents commonly employed for preparing alkali metal salts, e.g., sodium hydride and the alkali metal alkoxides such as sodium methoxide, sodium ethoxide, potassium methoxide and potassium ethoxide. The formation of the salt, preferably the sodium or potassium salt, is conveniently carried out in a suitable inert organic solvent, e.g., dimethylacetamide, diethylacetamide, dimethylformamide, dimetylsulfoxide and dioxane, and at room temperature.

In each of the Steps 1 and 2 discussed above, the product obtained can be readily recovered employing conventional techniques.

The compound II may also be employed to produce other compounds II, especially in situations in which R is nitro or amino in the starting compound II, and the ultimate product is one in which R is halo, amino or cyano. It is thus possible to produce compounds II in which R is amino from corresponding compounds II in which R is nitro employing a suitable elemental metal reducing agent such as iron, and an acidic reaction medium. The compounds II in which R is amino may be also converted by the well-known Sandmeyer reaction to compounds II in which R is cyano, or halo, particularly bromo, but may also be employed to produce compounds II in which R is alkoxy or alkylthio. Compounds II in which any one or more of R, Y and Y' is hydroxy and/or mercapto are preferably prepared by hydrolyzing the corresponding alkoxy or alkylthio substituted compound under acidic conditions in a conventional manner, e.g., with hydrobromic acid in acetic acid. Compounds I may be similarly produced from other appropriate compounds I.

For the preparation of compounds of formula II wherein R and R''' are as defined and R' represents a branched alkyl substituent and the branching occurs on the carbon atom directly attached to the ring nitrogen atom, e.g., isopropyl and sec-butyl, it is preferred to employ the process of Step 1 since said process affords better yields of the desired product.

Various of the quinazolinones used as starting materials for the preparation of the 1-metallo derivatives (VI) are known and can be prepared as described in the literature, for example, by reaction of the appropriately substituted-2-aminobenzophenone with urea at temperatures preferably between 160–200° C., followed by crystallization from a suitable solvent, e.g., ethanol, as disclosed in Japan Pat. 20,865/65 published Sept. 16, 1965. Such others which are not specifically disclosed may be prepared from available materials in analogous manner. Such quinazolinones can be also prepared from the appropriately substituted 2-aminobenzophenones by the reaction of Step 1.

The o-aminobenzophenones which are compounds V and employed in Step 1 are likewise either known or can be prepared from available materials by procedures known in the art. In situations were R is 5-nitro or 5-trifluoromethyl in compounds V, it is preferred to prepare such compounds by reaction of the corresponding 5-R (nitro or trifluoromethyl)-2-chlorobenzophenone with an appropriate amine ($R'NH_2$) in the presence of a suitable catalyst, such as a mixture of copper and cuprous chloride.

Certain of the compounds IA which may be represented by the formula IA', as follows:

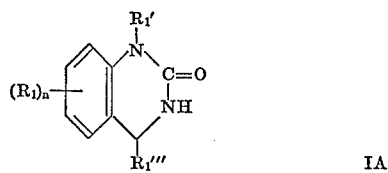

IA' wherein $R_1$ is, independently, hydrogen, halo of atomic weight no greater than 80, lower alkyl, lower alkoxy, nitro, cyano, acetamido, lower alkylthio or trifluoromethyl;

$n$ is 1 or 2, and when 2, $R_1$ is the same or different and either hydrogen, lower alkyl or lower alkoxy;

$R_1'$ is lower alkyl; and $R_1'''$ is the same as previously defined for R''' except that hydroxy is excluded from Y and Y';

may be also prepared by a two step reaction sequence C involving in a first Step C-1 the reaction of a 2-aminobenzohydrol of the formula VII:

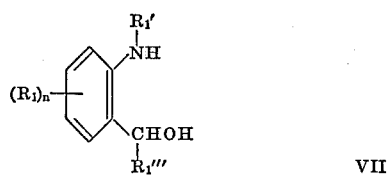

VII wherein $R_1$, $R_1'$, $R_2'''$ and $n$ are as above defined, with a compound VIII which is isocyanic acid having the formula VIII, as follows:

$$HN=C=O \qquad VIII$$

to obtain a disubstituted urea of the formula IX:

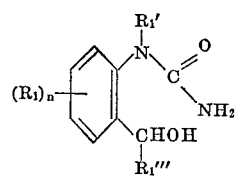

IX wherein $R_1$, $R_1'$, $R_1'''$ and $n$ are as above defined, said disubstituted urea of formula IX being cyclized in the second reaction Step C-2 to obtain the 3,4-dihydro-2(1H)-quinazolinone of formula IA'.

The preparation of the disubstituted urea intermediate of formula IX by Step C-1 involving reaction of the benzohydrol of formula VII with compound VIII is desirably carried out in an acidic aqueous medium at controlled temperatures in the range of 0° C. up to not in excess of about 80° C., preferably between 15° C. to 35° C. The isocyanic acid of formula VIII is desirably supplied in the form of a salt of the formula VIIIA, as follows:

$$M''N=C=O \qquad VIIIA$$

wherein M'' is a cation forming a water-soluble isocyanate which is an acidic medium yields isocyanic acid, said cation M'' preferably being a cation of an alkali metal, e.g., sodium and potassium; an alkaline earth metal, e.g., calcium; or the cation of ammonia, i.e., the ammonium salt. The preferred compound VIIIA is potassium isocyanate. The acid employed to provide the acidic reaction medium and produce in situ the desired isocyanic acid from the salt of formula VIIIA is preferably a strong inorganic acid, for example, sulfuric acid hydrochloric acid and the like, preferably, hydrochloric acid. Advantageously, it is not necessary to completely isolate the disubstituted urea product of Step C-1 and the crude product, for example, in the form of an oil, may be employed directly in the Step C-2 as starting material, as illustrated hereinafter in Example 7.

The production of compound IA' of the invention in Step C-2 is effected by cyclizing the disubstituted urea product of Step C-1. Such cyclization essentially involves the removal of the elements of water from the disubstituted urea compound IX. In the preferred forms of practice the reaction of Step C-2 is carried out at elevated temperatures and under acidic conditions leading to dehydration of the disubstituted urea IX. Reaction temperatures for Step C-2 are typically in the range of above 80° C. up to 150° C., preferably 95° C. to 120° C. The acid employed in the dehydration is desirably a strong inorganic acid such as sulfuric acid, hydrochloric acid and the like, preferably hydrochloric acid. Water may be employed as the sole reaction medium although various co-solvents, e.g., ethanol, may also be used, if desired or required to insure optimum solubility. The product compound IA' may be isolated from the reaction mixture of Step C-2 by conventional procedures. The production of compounds IA' by reaction sequence C including both Steps C-1 and C-2 is analogous to procedures described in the literature, for example, J. Chem. Soc. 1959, 3555.

The 2-substituted aminobenzohydrols which are compounds VII employed as starting material in Step C-1 are either known or can be prepared from available materials by established procedures. One preferred method for preparation of compounds VII involves reaction of a 2-aminobenzophenone with sodium borohydride in a suitable inert organic solvent as described in the literature by G. N. Walker, J. Org. Chem. 27, 1929 (1962).

Compound IB of the invention in which R''B is ω-dialkylaminoalkyl will have a basic nitrogen atom and thus may form acid addition salts, and may be produced and isolated as such acid addition salts, as desired or required. It will be evident that pharmaceutically acceptable acid addition salts not materially affecting the pharmacological effect of compounds IB are also within the scope of the present invention. Such pharmaceutically acceptable salts may include, by way of illustration, the hydrochloride, fumarate, maleate, formate, acetate, sulfonate and malonate. The acid addition salts of the subject compound IB may be produced from the corresponding free bases by conventional procedures. Conversely, the free bases may be obtained from the salts by procedures known in the art.

The compounds of structural formula I (IA and IB) are useful because they possess pharmacological activity in animals. In particular, the compounds are useful as anti-inflammatory agents as indicated by the Carrageenan-induced edema test on rats. For such usage, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned uses, the dosage administered will, of course, vary depending upon known factors such as the compounds used and the mode of administration. However, in general, satisfactory results are obtained when administered at a daily dosage of from about 20 milligrams to about 100 milligrams per kilogram of body weight, commonly about 50 mg./kg., preferably given in divided doses 2 to 4 times a day, or in sustained release form. For most mammals the administration of from about 80 milligrams to about 1000 milligrams of the compound per day provides satisfactory results and dosage forms suitable for internal administration comprise from about 20 milligrams to about 500 milligrams of the compound in admixture with a solid or liquid pharmaceutical carrier or diluent.

A representative formulation is a tablet prepared by conventional tabletting techniques and containing the following ingredients.

| Ingredients: | Parts by weight |
| --- | --- |
| 3,4-Dihydro - 1 - isopropyl - 7 - methyl-phenyl- 2(1H)-quinazolinone | 50 |
| Tragacanth | 2 |
| Lactose | 39.5 |
| Corn starch | 5 |
| Talcum | 3 |
| Magnesium stearate | 0.5 |

Certain of the compounds IA of the invention represented by the formula IA″, as follows:

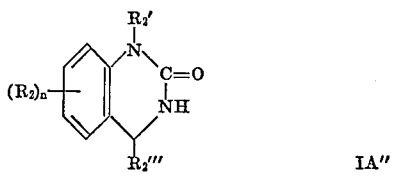

wherein $R_2$ is, independently, hydrogen, halo of atomic weight of no greater than 80, lower alkyl, lower alkoxy, nitro, cyano, or trifluoromethyl;

$n$ is 1 or 2, and when 2, $R_2$ is the same or different and either hydrogen, lower alkyl or lower alkoxy;

$R_2'$ is lower alkyl; and $R_2'''$ is the same as previously defined for $R'''$ except that hydroxy is excluded from Y and Y';

may be also employed as intermediates in preparation of corresponding 1-substituted - 4-aryl-2(1H)-quinazolinones according to a Step D reaction which involves oxidizing said compound IA″ in a suitable medium to obtain a corresponding 1-substituted - 4-aryl-2(1H)-quinazolinone of the formula X, as follows:

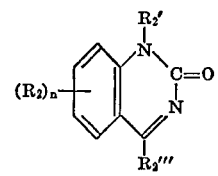

wherein $R_2$, $R_2'$, $R_2'''$ and $n$ are as above-defined.

The preparation of compounds X from compounds IA″ by Step D involves an oxidation of compound IA″ which may be carried out in an inert solvent and at temperatures suitably in the range of 0° C. to 50° C., preferably 15° C. to 30° C. Any of the well known suitable inert organic solvents may be employed, for example, dioxane and acetone, preferably dioxane. The oxidizing agents preferably are the alkali metal permanganate, more preferably potassium permanganate. The product compound X may be isolated by working up in a known manner.

The following examples show representative compounds encompased within the scope of this invention and the manner in which such compounds are prepared. However, it is to be understood that the examples are for purposes of illustration only.

EXAMPLE 1

3,4-dihydro-1-methyl-4-phenyl-2(1H)-quinazolinone

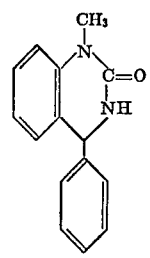

Step A.—Preparation of 1-methyl-4-phenyl-2(1H)-quinazoline: A mixture of 1.0 g. of o-methylaminobenzophenone, 2.0 g. of urethane and 20 mg. of zinc chloride is heated for 1¼ hours at 180°–190° C. (oil bath). The resulting mixture is cooled to room temperature and the resulting solid material treated with 100 ml. of a 1:1 mixture of methylene chloride and water. The organic phase is separated, dried over anhydrous sodium sulfate, filtered and the solvent evaporated off. The residue is crystallized from ethyl acetate to obtain 1-methyl-4-phenyl-2(1H)-quinazolinone; m.p. 141°–143° C.

Step B.—Preparation of 3,4-dihydro-1-methyl-4-phenyl-2(1H)-quinazolinone: To a solution of 25 g. of 1-methyl-4-phenyl-2(1H)-quinazolinone dissolved in 500 ml. of 95% ethanol is added 7 g. of sodium borohydride. The resulting mixture is allowed to stand at room temperature for 1½ hours and there is then added acetic acid dropwise to destroy excess sodium borohydride as indicated by a cessation of gas evolution on further addition of the acetic acid. The resulting mixture is diluted with 1 liter of water, made alkaline by addition of 2N sodium hydroxide and filtered to obtain the precipitate product which is white prisms of 3,4-dihydro-1-methyl-4-phenyl-2(1H)-quinazolinone; m.p. 184°–185° C.

EXAMPLE 2

3,4-dihydro-1-isopropyl-4-phenyl-2(1H)-quinazolinone

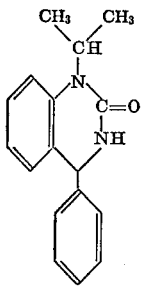

Step A.—Preparation of 1-isopropyl-4-phenyl-2(1H)-quinazolinone: A mixture of 21 g. of crude o-isopropylaminobenzophenone, 40 g. of urethane and 1.5 g. of zinc chloride is heated for 4 hours at 180°–200° C. (oil bath). The resulting mixture is cooled to room temperature and then there is added thereto 200 ml. of methylene chloride. The resulting mixture is filtered and the filtrate extracted twice with 100 ml. (each) of water. The organic phase is dried over anhydrous sodium sulfate and evaporated in vacuo. The residue is crystallized from ethyl acetate to obtain 1-isopropyl-4-phenyl-2(1H)-quinazolinone; m.p. 140° C.

Step B.—Prepaartion of 3,4-dihydro-1-isopropyl-4-phenyl-2(1H)-quinazolinone: Following the procedure of Step B of Example 1, 719 g. of 1-isopropyl-4-phenyl-2(1H)-quinazolinone is reacted with 2 g. of sodium borohydride in 150 ml. of 95% ethanol to obtain 3,4-dihydro-1-isopropyl-4-phenyl-2(1H)-quinazolinone; m.p. 145° C.

EXAMPLE 3

3,4-dihydro-1-isopropyl-7-methyl-4-phenyl-2(1H)-quinazolinone

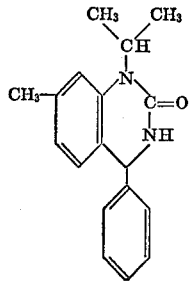

Step A.—Preparation of 4-methyl-2-isopropylaminobenzophenone: A mixture of 7 g. of 4-methyl-2-aminobenzophenone, 6.35 g. of sodium carbonate and 18.8 ml. of 2-iodopropane is stirred and refluxed for 3 days. The cooled reaction mixture is then diluted with 200 ml. of benzene and washed twice with water and twice with brine. The organic phase is separated, dried over anhydrous sodium sulfate and concentrated in vacuo to remove substantially all of the benzene. The resulting yellow oil is dissolved in about 10 ml. of methylene chloride and subjected to column chromatography employing alumina (about 400 g.) and methylene chloride as eluant to give a first fraction which on concentration in vacuo to remove methylene chloride produced a yellow oil of 4-methyl-2-isopropylaminobenzophenone.

Step B.—Preparation of 1-isopropyl-methyl-4-phenyl-2(1H)-quinazolinone: A mixture of 5. g. of 4-methyl-2-isopropylaminobenzophenone prepared in Step A above, 13.9 g. of urethane and 500 milligrams of zinc chloride is heated at a temperature of 190° C. for 1½ hours. There is then additionally added 7 g. of urethane and 250 milligrams of zinc chloride, and the heating continued at a temperature of 190° C. for an additional 2½ hours. The resulting mixture is cooled to about 100° C. and diluted with chloroform. The resulting mixture is then filtered and the filtrate washed first with water and then with brine. The organic phase is separated, dried over anyhdrous sodium sulfate and concentrated in vacuo to remove substantially all of the chloroform and obtain an oily residue which is dissolved in a small amount of about 20 ml. of methylene chloride. The resulting solution is then diluted with about 40 ml. of ethyl acetate and concentrated in vacuo to crystallize 1-isopropyl-7-methyl-4-phenyl-2(1H)-quinazolinone; m.p. 137° to 138° C.

Step C.—Preparation of 3,4-dihydro-1-isopropyl-7-methyl-4-phenyl-2(1H)-quinazolinone: Following the procedure of Step B of Example 1, and employing equivalent amounts, 1-isopropyl-7-methyl-4-phenyl-2(1H)-quinazolinone is reacted with sodium borohydride to obtain 3,4-dihydro-1-isopropyl-7-methyl-4-phenyl - 2(1H) - quinazolinone; m.p. 159°–162° C.

EXAMPLE 4

3,4-dihydro-3-(2-dimethylaminoethyl)-1-methyl-4-phenyl-2(1H)-quinazolinone bimaleate

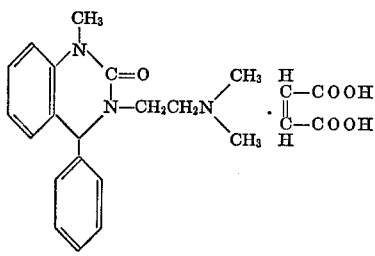

To a solution of 2.38 g. of 3,4-dihydro-1-methyl-4-phenyl-2(1H)-quinazolinone (prepared as in Example 1) in 50 ml. of dimethylacetamide is added 700 mg. of a 50% suspension of sodium hydride in mineral oil. The resulting mixture is allowed to stand for 15 minutes at temperature of 40°–50° C. and there is then added 2.5 ml. of 2-chloro-N,N'-dimethylethylamine after which the mixture is allowed to stand for 1½ hours at room temperature, followed by heating for 15 minutes at temperature of 50° C. The resulting mixture is poured onto 200 ml. of ice water and extracted twice each with 100 ml. of methylene chloride. The organic phases are combined, dried over anhydrous sodium sulfate, filtered, and evaporated in vacuo to obtain an oily residue which is dissolved in 20 ml. of ethanol and treated by addition of 1.16 g. of maleic acid. The resulting solution is evaporated to dryness and the resulting residue crystallized from ethyl acetate/diethylether (1:1) to obtain 3,4-dihydro-3-(2-dimethylaminoethyl)-1-methyl-4-phenyl - 2(1H) - quinazolinone bimaleate; m.p. 142° C.

EXAMPLE 5

3,4-dihydro-3-(3-dimethylaminopropyl)-1-methyl-4-methyl-4-phenyl-2(1H)-quinazolinone bimaleate

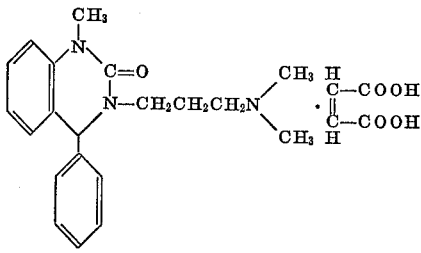

Following the procedure of Example 4, except that 3 chloro-N,N'-dimethylpropylamine is substituted for 2-chloro-N,N'-dimethylethylamine, there is obtained on crystallization from ethyl acetate crystals of 3,4-dihydro-3-(3 - dimethylaminopropyl) - 1 - methyl - 4-phenyl-2(1H)-quinazolinone bimaleate; m.p. 126° C.

EXAMPLE 6

3,4-dihydro-1-isopropyl-3-(3-dimethylaminopropyl)-4-phenyl-2(1H)-quinazolinone

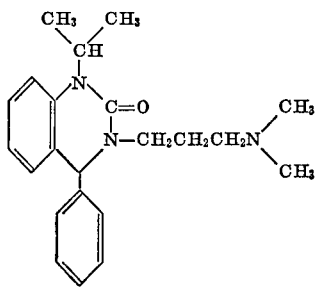

Following the procedure of Example 4 (except as indicated herein), and employing equivalent amounts, 3,4-dihydro-1-isopropyl-4-phenyl-2(1H)-quinazolinone (prepared as in Example 2) is reacted with sodium hydride and 3-chloro-N,N'-dimethylpropylamine to obtain a crude oily residue of the product which is subjected to chromatography on aluminum oxide to obtain a purified colorless oil of 3,4-dihydro-1-isopropyl-3-(3-dimethylaminopropyl)-4-phenyl-2(1H)-quinazolinone.

EXAMPLE 7

The following additional compounds which may be prepared analogously to preceding examples are further representative of the invention:

(a) 1-isopropyl-6-methoxy-4-phenyl-3,4-dihydro-2(1H)-quinazolinone, m.p. 149°–150° C.

(b) 1-isopropyl-6-methoxy-4-(4-methylphenyl)-3,4-dihydro-2(1H)-quinazolinone, m.p. 180–181° C.

(c) 1-isopropyl-6-methoxy-4-(3-methylphenyl)-3,4-dihydro-2(1H)-quinazolinone, m.p. 167°–168° C.

(d) 1-isopropyl-6-methoxy-4-(3-methoxyphenyl)-3,4-dihydro-2(1H)-quinazolinone, m.p. 164°–166° C.

(e) 1-isopropyl-6-methoxy-4-(2,6-dichlorophenyl)-3,4-dihydro-2(1H)-quinazolinone, m.p. 207.5°–208.5° C.

(f) 1-isopropyl-6-methyoxy-4-(4-isopropylphenyl)-3,4-dihydro-2(1H)-quinazolinone, m.p. 120–121° C.

What is claimed is:

1. A compound of the formula:

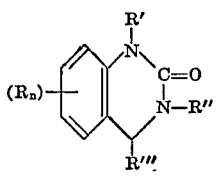

wherein

R is, independently, hydrogen, halo having an atomic weight no greater than 80; lower alkyl; lower alkoxy; nitro; cyano; lower alkylthio; amino; hydroxy; mercapto; acetamido; or trifluoromethyl;

$n$ is 1 or 2, and when 2, R is the same or different and either hydrogen, halo, lower alkyl or lower alkoxy;

R' is lower alkyl;

R" is hydrogen; lower alkyl; or ω-di(lower)alkyl amino (lower)alkyl;

R'" is phenyl; or substituted phenyl of the formula:

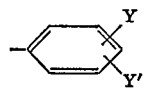

Y represents halo; hydroxy; lower alkyl; lower alkoxy; or trifluoromethyl; and

Y' represents hydrogen; halo; hydroxy; lower alkyl; or pharmaceutically acceptable acid addition salts thereof.

2. A compound of claim 1 in which R" is hydrogen.

3. The compound of claim 2 which is 3,4-dihydro-1-methyl-4-phenyl-2(1H)-quinazolinone.

4. A compound of claim 2 in which R' is isopropyl.

5. The compound of claim 4 which is 3,4-dihydro-1-isopropyl-4-phenyl-2(1H)-quinazolinone.

6. The compound of claim 4 which is 3,4-dihydro-1-isopropyl-7-methyl-4-phenyl-2(1H)-quinazolinone.

7. A compound of claim 1 in which R" is selected from the group of lower alkyl and ω-dialkylaminoalkyl.

8. A compound of claim 7 in which R" is a ω-dialkylaminoalkyl.

9. The compound of claim 8 which is 3,4-dihydro-3-(2-dimethylaminoethyl) - 1 - methyl - 4 - phenyl - 2(1H)-quinazolinone.

10. The compound of claim 8 which is 3,4-dihydro-3-(3-dimethylaminopropyl) - 1 - methyl - 4 - phenyl - 2(1H)-quinazolinone.

11. A compound of claim 8 in which R' is isopropyl.

12. The compound of claim 11 which is 3,4-dihydro-1-isopropyl - 3 - (3 - dimethylaminopropyl) - 4 - phenyl-2(1H)-quinazolinone.

References Cited

Hanschke, Ber. Deutsch Chem. Ges. *32*, 2021, 2026 (1899).

DONALD G. DAUS, Primary Examiner

R. V. RUSH, Assistant Examiner

U.S. Cl. X.R.

260—256.4 Q, 256—.5 R; 424—251